United States Patent
Nakano

(10) Patent No.: US 6,181,252 B1
(45) Date of Patent: Jan. 30, 2001

(54) REMOTE CONTROL SYSTEM AND METHOD HAVING A SYSTEM-SPECIFIC CODE

(75) Inventor: Akio Nakano, Kariya (JP)

(73) Assignee: Denso Corporation, Kariya (JP)

(*) Notice: Under 35 U.S.C. 154(b), the term of this patent shall be extended for 0 days.

(21) Appl. No.: 08/916,671

(22) Filed: Aug. 22, 1997

(30) Foreign Application Priority Data

Aug. 23, 1996 (JP) .................................................. 8-222044

(51) Int. Cl.⁷ ............................................................ G06F 7/04
(52) U.S. Cl. ................................... 340/825.31; 307/10.2
(58) Field of Search ....................... 340/825.72, 825.69, 340/825.31; 384/43; 307/10.5; 342/42; 341/176

(56) References Cited

U.S. PATENT DOCUMENTS

| | | | |
|---|---|---|---|
| 4,596,985 | * 6/1986 | Bongard et al. | 340/825.69 |
| 5,552,789 | * 9/1996 | Schuermann | 342/42 |
| 5,600,324 | * 2/1997 | Reed | 341/176 |
| 5,708,307 | * 1/1998 | Iijima et al. | 307/10.5 |
| 5,733,047 | * 3/1998 | Furuta et al. | 384/43 |
| 5,774,065 | * 8/1995 | Mabuchi et al. | 340/825.72 |

FOREIGN PATENT DOCUMENTS

| | | |
|---|---|---|
| 8-144595 | 6/1996 | (JP) . |
| 8-170457 | 7/1996 | (JP) . |
| 8-182058 | 7/1996 | (JP) . |
| 8-182078 | 7/1996 | (JP) . |
| 8-260783 | 10/1996 | (JP) . |

\* cited by examiner

*Primary Examiner*—Michael Horabik
*Assistant Examiner*—M Shimizu
(74) *Attorney, Agent, or Firm*—Pillsbury Madison & Sutro LLP

(57) ABSTRACT

In a remote control system having a transmitter and a receiver, a rolling code is ciphered to generate a ciphered rolling code by repeating, n times, an exclusive-OR operation on a constant code in a rolling code table and the rolling code as well as an-maximum shift keying. A key code specific to each control system is used as a constant code at the k-th exclusive-OR logic operation so that the k-th exclusive-OR logic operation becomes different from system to system resulting in different ciphering method for each system. The key code is set in an EEPROM in the process of control system production so that the rolling code may not be deciphered even by a design engineer as long as the key code is kept undisclosed.

14 Claims, 5 Drawing Sheets

| ADDRESS | CONSTANT CODE (j bits) | |
|---|---|---|
| $X_1$ | CONSTANT CODE | $X_1$ |
| $X_2$ | CONSTANT CODE | $X_2$ |
| ⋮ | ⋮ | |
| $X_k$ | CONSTANT CODE | $X_k$ ← KEY CODE |
| ⋮ | ⋮ | |
| $X_n$ | CONSTANT CODE | $X_n$ |

REMOTE CONTROL SYSTEM AND METHOD HAVING A SYSTEM-SPECIFIC CODE

CROSS REFERENCE TO RELATED APPLICATION

This application is related to and incorporates herein by reference Japanese Patent Application No. 8-222044 filed on Aug. 23, 1996.

BACKGROUND OF THE INVENTION

1. Field of the Invention

The present invention relates to a remote control system and method which is used for a vehicular wireless door control system or the like.

2. Description of Related Art

In a remote control system employed conventionally in a vehicular wireless door control system, from the standpoint of restricting unauthorized uses of a vehicle, a transmission code to be transmitted from a transmitter is ciphered so as not to be deciphered. In the system disclosed in JP-A 8-102982 U.S. Pat. No. 08/510,469 filed on Aug. 2, 1995), for instance, a transmission code is ciphered by the use of a rolling code which is updated in the predetermined order each time the rolling code is transmitted from a transmitter to a receiver.

According to this system, as the rolling code is updated each time in the predetermined order, a design engineer who has designed the system (transmitter and receiver), and hence the updating order of the rolling code, can decipher the transmission code thus ciphered. This may possibly result in the unauthorized uses of the system by the design engineer, for instance.

SUMMARY OF THE INVENTION

The present invention has an object to provide a remote control system and method which disables even a system design engineer to decipher a transmission code transmitted from a transmitter to a receiver.

The present invention has an object to provide a remote control system and method in which a transmission code to be transmitted from a transmitter to a receiver includes a rolling code ciphered by the use of a system-specific code.

For attaining the above object, according to the present invention, a transmitter ciphers a rolling code based on a system-specific code specifically set for each system to generate a ciphered rolling code, and ciphers an ID code by the use of the ciphered rolling code. Thus, as long as the key code set specifically for the control system is kept undisclosed, it becomes difficult even for such an engineer, who is engaged in determining a rolling code generating algorithm, to decipher the ciphered rolling code. As a result, deciphering is made to be more difficult so that an unauthorized use by other than the owner of the control system may be restricted.

Preferably, the rolling code is generated by repeating a logic operation and an Maximum shift keying a plurality of times, so that the deciphering of the rolling code is made much more difficult.

Preferably, the system-specific code is set and stored in a nonvolatile memory in a production process of the system, not at the time of system designing process, so that the ciphered rolling code may not be deciphered as long as the system-specific code is kept undisclosed or the system-specific code is determined randomly at the production process.

BRIEF DESCRIPTION OF THE DRAWINGS

Other objects, features and advantages will become more apparent from the following detailed description when read with reference to the accompanying drawings, in which.

DETAILED DESCRIPTION OF THE PRESENTLY PREFERRED EMBODIMENT

Figure 1:
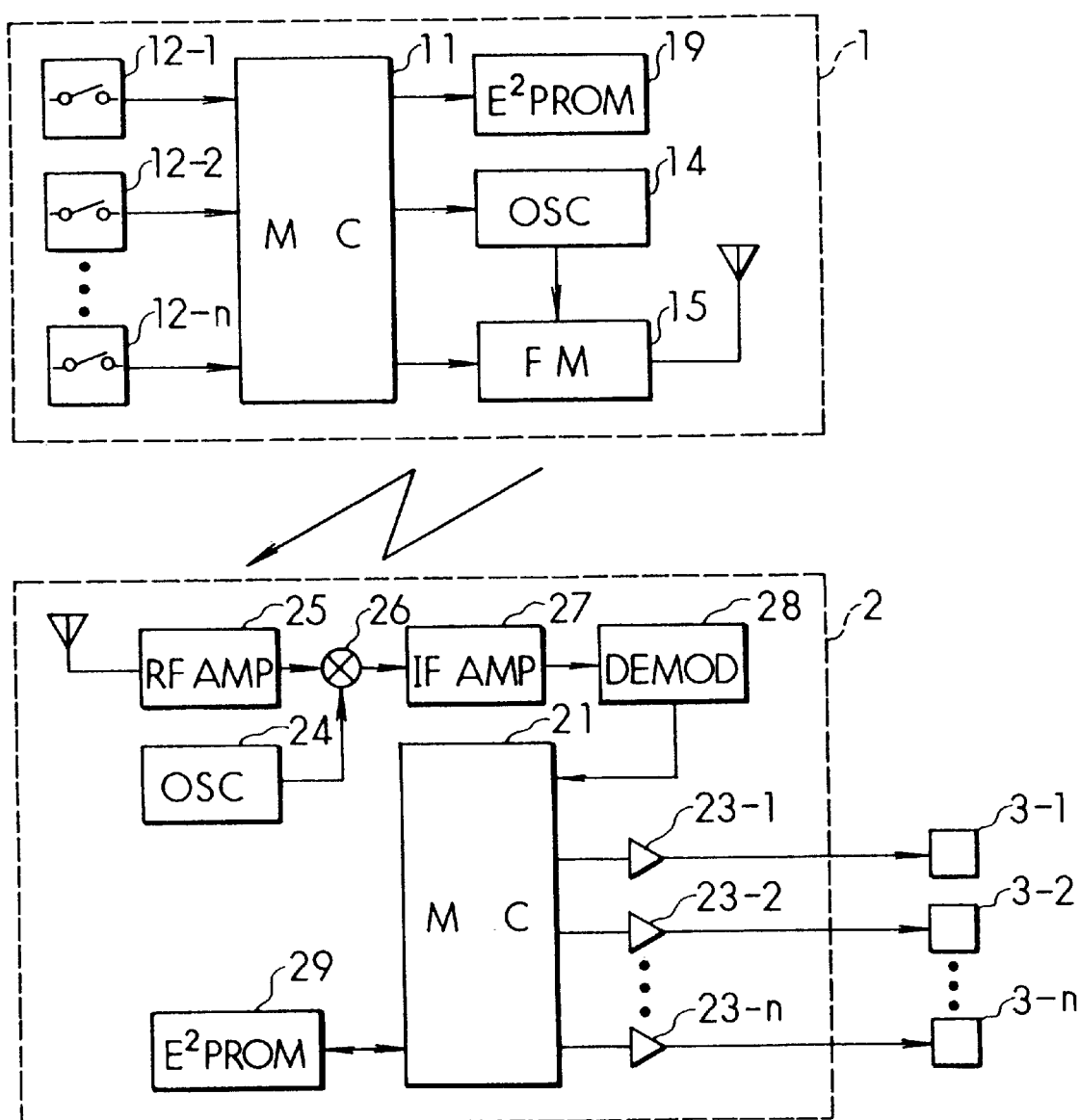
FIG. 1 is a block diagram showing a construction of an embodiment of the present invention.

The present embodiment will be described hereinbelow with reference to embodiments shown in the drawings.

(First Embodiment)

Figures 3, 4:
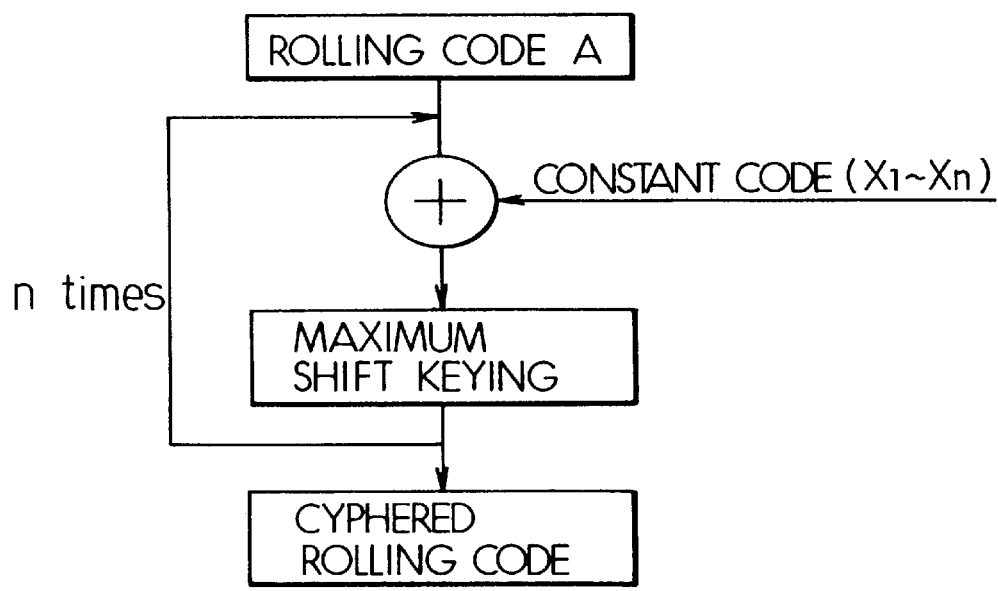
FIG. 3 is a table showing constants used for ciphering a rolling code A.
FIG. 4 is a flow chart showing a rolling data ciphering in the first embodiment.
Figure 5:
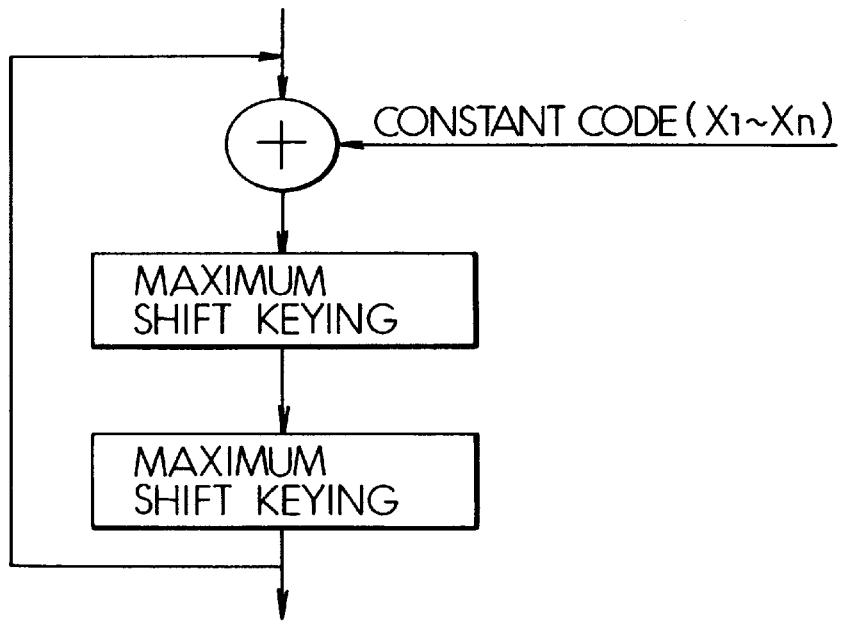
FIG. 5 is a flow chart showing a rolling code ciphering in another embodiment.

In FIG. 1 showing the first embodiment in which a remote control system of the present invention is used for a vehicular wireless door lock control, the system includes a transmitter 1 provided for a user of a vehicle and a receiver 2 provided for the vehicle. The transmitter 1 has switches 12-1, 12-2, . . . and 12-n for remotely controlling various control functions (locking/unlocking of a door, opening/closing of a trunk, adjusting a seat position and the like) different from each other. The switch conditions are applied to a microprocessor 11. The microprocessor 11 is connected to a nonvolatile EEPROM 19 which stores an ID code A specific to each transmitter 1, a rolling code A to be updated in a predetermined order at each transmission of a transmission code and a key code (system-specific code) specific to each vehicle. The ID code A, rolling code A and the key code are to be stored in the EEPROM 19 in the production process of the control system or the vehicle. In the microprocessor 11, a rolling code updating table for ciphering the rolling code A and information for generating a transmission code are stored as an algorithm. The rolling code table is so constructed, as shown in FIG. 3, that constant codes $x_1$-$x_n$, each in j bits and different, are stored in addresses $x_1$-$x_n$ respectively. The key code specific to the vehicle is read out from the EEPROM 19 into the address $x_k$ ($1 \leq k \leq n$) to be set as the constant code $x_k$. Further, the microprocessor 11 is connected to an oscillator circuit 14 and an FM modulator circuit 15 so that the transmission code generated by the microprocessor 11 is radiated as a low power radio wave after an FM modulation.

The receiver is constructed, for demodulating the low power radio wave radiated from the transmitter 1, by a high frequency amplifier circuit 25, a local oscillator 24, a mixer circuit 26, medium frequency amplifier circuit 27 and a demodulator circuit 28, so that a demodulated output signal is applied to a microprocessor 21. The microprocessor 21 restores the ID code A and the rolling code A from the demodulated output signal based on the predetermined processing. The microprocessor 21 is connected to a nonvolatile EEPROM 29 which stores therein an ID code B specific to each receiver 2, a rolling code B corresponding to the rolling code included in the previously received transmission code and the key code specific to each vehicle. Further, in the microprocessor 21, a rolling code updating table (same as shown in FIG. 3) for restoring the rolling code A and information for restoring the ID code A and the rolling code A from the output signal are stored as an algorithm. The microprocessor 21 is connected to control objects 3-1, 3-2, . . . and 3-n (actuators for door locking/unlocking, trunk opening/closing, seat position adjusting and the like). through respective driving circuits 23-1, 23-2 . . . and 23-n. The control objects 3-1, 3-2, . . . and 3-n are constructed to operate in response to signals from the microprocessor 21.

Figure 2A:
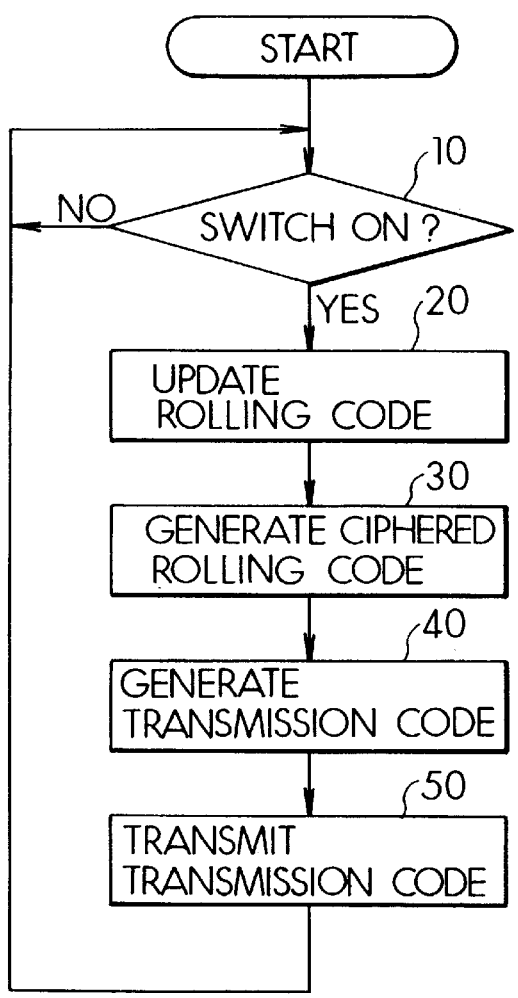
FIGS. 2A and 2B are flow charts showing operations of a transmitter and a receiver shown in FIG. 1.
Figure 2B:
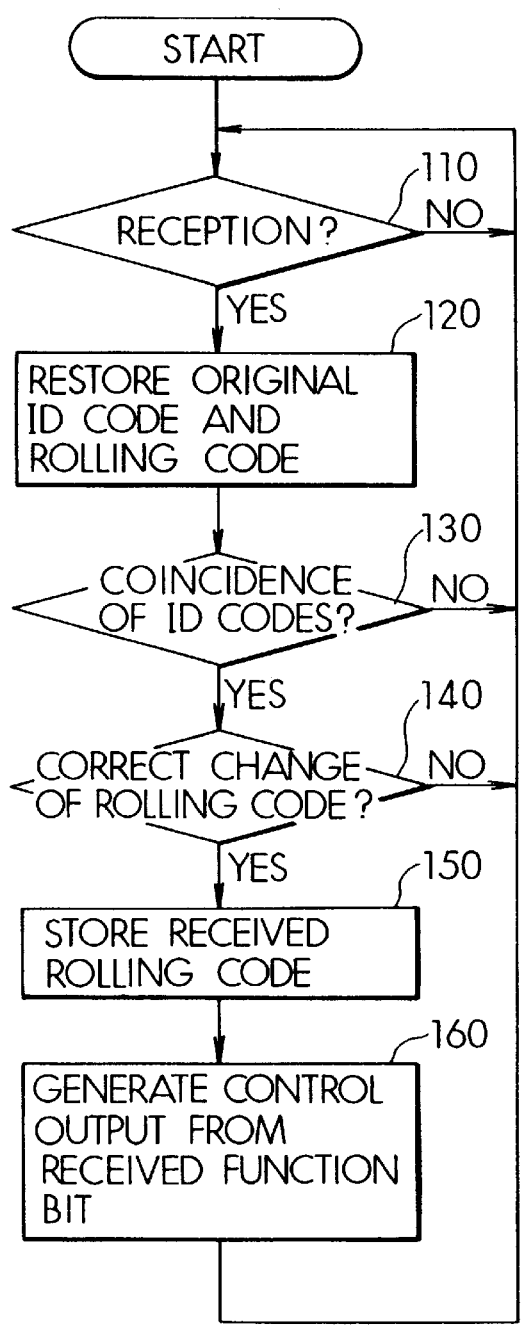

The operations of the transmitter 1 and the receiver 2 will be described with reference to flow charts in FIGS. 2A and 2B, which are processes executed by the microprocessors 11 and 21 provided in the transmitter 1 and the receiver 2, respectively.

The operation of the transmitter 1 is described first. The process is in the wait condition until a step 10 determines that either one of the switches 12-1 through 12-n is operated, and moves to a step 20 at the time of determination of the switch operation. The step 20 updates the rolling code A which is a variable comprising j bits and is updated by +1 at each transmission operation. This updating is not limited to the +1 change, but may be other changes based on a predetermined rule.

Next step 30 ciphers the rolling code A by the use of a rolling code updating table to generate a ciphered rolling code.

This ciphered rolling code generation is described in detail with reference to FIGS. 3 and 4.

First, the constant code $x_1$ in the address $x_1$ in the rolling code updating table shown in FIG. 3 and the rolling code A are subjected to an exclusive-OR logic operation. Then a well-known Maximum shift keying is performed. Thereafter, the exclusive-OR logic operation for each of the constant codes $x_2$ through $x_n$ in the addresses $x_2$ through $x_n$ as well as the Maximum shift keying are repeated n times. By this repetition of the logic operation and the Maximum shift keying, the rolling code A is ciphered to generate the ciphered rolling code. At the time of k-th exclusive-OR logic operation, the key code specific to the vehicle is used as the constant code $x_k$ so that the k-th exclusive-OR logic operation may be different from vehicle to vehicle. That is, the ciphering method differs from vehicle to vehicle. As the key code is set into the EEPROM 19 in the process of the system or vehicle production, even an engineer who designs the logic shown in FIG. 4 will not be enabled to decipher the ciphering of the rolling code A by intercepting the transmission code, as long as the key code is kept undisclosed to the design engineer or set at random in the process of production by other than the design engineer. The key code may include date or time information of the production with other vehicle specific information.

The following step 40 generates the transmission code using the ciphered rolling code, ID code A stored in the EEPROM 19 and a function code. It is to be noted that the key code is not used in this step so that the transmission code does not include the key code. The function code is for operating the actuator 3-1, 3-2, . . . or 3-n of the control object. A step 50 transmits the transmission code generated by the step 40 to the FM modulator circuit 15, which in turn FM-modulates and radiates the transmission code as the low power radio wave externally from the transmitter 1. The generation of the transmission code is described fully in JP-A 8-102982 (U.S. patent application No. 08/510,469 filed on Aug. 2, 1995 and assigned to the same assignee as this application), the description of which is incorporated herein by reference.

The above sequence of steps is a process at the side of the transmitter 1 when the operation switch is operated once. The above process from steps 20 through 50 is executed again when the operation switch is operated again, while updating the rolling code.

The operation of the receiver 2 is described next. The process is in the wait condition until a step 110 determines that the transmission code from the transmitter 1 is received, moving to a step 120 when the transmission code is received. The step 120 restores the ID code A and the rolling code A from the transmission code. In this restoring operation, particularly in deciphering the ciphered rolling code into the rolling code A, the same key code as used in the transmitter 1 is used. This key code is stored in the receiver 2 as well.

The next step 130 determines whether the ID code B stored in the EEPROM 29 coincides with the ID code A of the transmission code restored in the step 120. The process moves to a step 150 if the ID codes A and B coincide, while it stays in the wait condition at the step 110 if the ID codes A and B do not coincide.

Further, step 140 compares the rolling code A restored in the step 120 with the rolling code B stored in the EEPROM 29 to determine whether the restored rolling code A is within a predetermined range from the rolling code B. If within the predetermined range, the process moves to a step 150 determining that the rolling code is valid. If not within the predetermined range, the process stays in the wait condition at the step 110.

In the event that the transmission code of the transmitter 1 is received each time by the receiver 2, the rolling code A to be compared in the receiver 2 may be limited to a value which is a sum of the rolling code B and +1. If the receiver 2 receives nothing while the transmitter 1 is operated, only the rolling code A may be updated by the microcomputer 11 in accordance with the operation of switches 12-1, 12-2, . . . or 12-n. The predetermined range is provided to overcome this problem. For instance, assuming that the rolling code A restored from the transmission code has a value $r_i$ and the rolling code B stored in the EEPROM 29 has a value $r_{i-1}$, the rolling code A is determined valid if $r_{i-1}+1 \leq r_i \leq r_{i-}+\alpha$ ($\alpha$ being an arbitrary natural number).

The next step 150 stores the rolling code A restored from the transmission code in the EEPROM 29 as the rolling code B, thus updating the rolling code B. As a result, even when only the rolling code A in the transmitter 1 is updated thus causing a difference between the rolling codes A and B set in the transmitter 1 and the receiver 2, the rolling code B is updated by the rolling code A restored from the transmission code once the receiver 2 receives the transmission code. Thus, the rolling code A and the rolling code B will coincide with each other after the reception of the transmission code.

Then, a step 160 operates the actuator 3-1, 3-2, . . . or 3-n through the respective driving circuit 23-1, 23-2, . . . or 23-n in accordance with the function code set in the transmission code.

(Other Embodiments)

Figure 6:
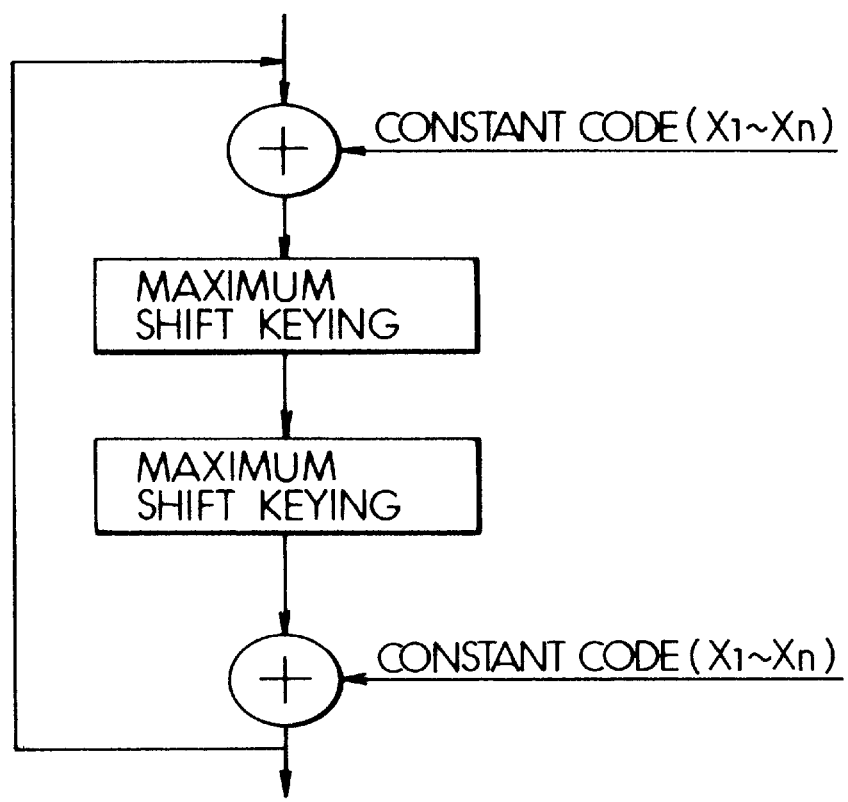
FIG. 6 is a flow chart showing a rolling code ciphering in a still another embodiment.
Figure 7:
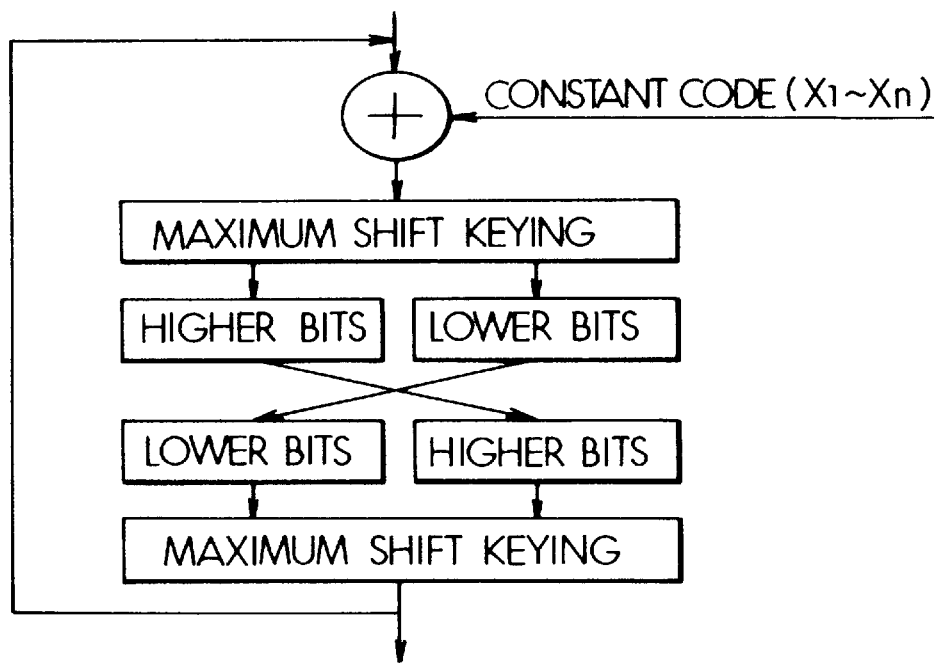
FIG. 7 is a flow chart showing a rolling code ciphering in a further embodiment.
Figure 8:
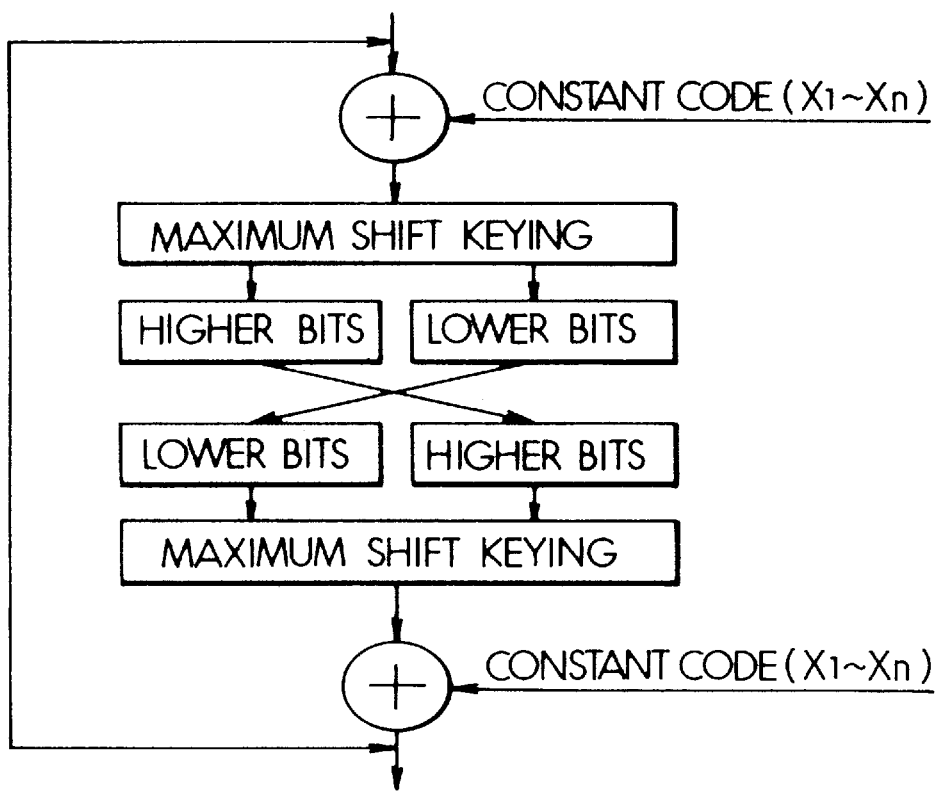
FIG. 8 is a flow chart showing a rolling code ciphering in a still further embodiment.

Although the rolling code is ciphered by a set of one exclusive-OR logic operation and one Maximum shift keying in the first embodiment, it may be ciphered by a set of one exclusive-OR logic operation and two Maximum shift keyings as shown in FIG., 5 or by a set of two exclusive-OR logic operations and two Maximum shift keyings as shown in FIG. 6. Further as shown in FIGS. 7 and 8, following the first one of the Maximum shift keyings, the higher-bit half and the lower-bit half of j bits of the rolling code may be exchanged. By the ciphering processes in FIGS. 5 through 8, deciphering the ciphered rolling code can be made more difficult.

Although the same key code is set and stored in both of the transmitter 1 and the receiver 2 at the time of system or vehicle production in the first embodiment, the key code may be stored in the transmitter 1 and the receiver 2 at the different time, for instance, it may be stored in the transmitter 1 and the receiver 2 during producing the system and after installing the system in the vehicle, respectively. Further, the key code may be stored in the receiver 2 by the use of transmission operation of the transmitter 1. In this instance, as the key code is not included in the transmission code for disabling deciphering, the transmitter 1 may be constructed to transmit exceptionally the key code as it is in addition to the ID code only when the switches in the transmitter 1 are operated in a specified manner or order which does not occur in the normal use, thus setting a key code registering transmission mode in the transmitter 1.

Each remote control system may include a plurality of transmitters 1 for one receiver 2. The key codes set and stored for the transmitters 1 are preferably different from each other.

In this instance, the receiver 2 needs be constructed to store all the key codes together with the respective ID codes.

Although the EEPROMs 19 and 29 are provided separately from the microprocessors 11 and 21 in the first embodiment, the former may be incorporated integrally into the latter respectively. Further, although the key code is set only in the address $x_k$ in the rolling code updating table in the first embodiment, it may be set in a plurality of addresses. Still further, although the first embodiment is constructed to operate various control functions, it may be modified to operate only one control function by which no function bit is necessitated.

The present invention should not be limited to the disclosed embodiments but includes other modifications and alterations which will be made without departing from the spirit of the invention.

What is claimed is:

1. A remote control system comprising:
   a transmitter for transmitting a transmission code including an ID code specifically identifying the transmitter and a rolling code, the ID code being ciphered at each transmission of the ID code;
   a receiver for receiving the transmission code transmitted from the transmitter, restoring the ID code from the transmission code and producing a command output for driving a control object,
   wherein the transmitter includes:
      storing means for storing a system-specific code set specifically to the remote control system such that different remote control systems are assigned different system-specific codes, the system-specific code being set independently of the ID code and is set as a random code during production of the remote control system;
      ciphering means for ciphering the rolling code based on the system-specific code to generate a ciphered rolling code; and
      code generating means for generating the transmission code based on the ID code and the ciphered rolling code.

2. The remote control system according to claim 1, wherein:
   the receiver has storing means that stores the same system-specific code as in the transmitter.

3. The remote control system according to claim 1, wherein:
   the transmitter has a rolling code updating table in which constant codes different from each other are stored; and
   the cyphering means is constructed to generate the ciphered rolling code by logical operation on the rolling code and the constant codes determined in the rolling code updating table.

4. The remote control system according to claim 3, wherein:
   the cyphering means is constructed to generate the ciphered rolling code by a maximum shift keying after the logic operation on the rolling code and the constant code.

5. The remote control system according to claim 4, wherein:
   the cyphering means is constructed to generate the ciphered rolling code by repeating the logic operation and the maximum shift keying.

6. The remote control system according to claim 1, wherein:
   the storing means includes a nonvolatile memory device; and
   the system-specific code is stored in the nonvolatile memory device in a production process of the remote control system.

7. The remote control system according to claim 2, wherein:
   the storing means includes a nonvolatile memory device; and
   the system-specific code is stored in the nonvolatile memory device in a production process of the remote control system.

8. The remote control system according to claim 6, wherein:
   the system-specific code is read out from the nonvolatile memory device and is used to address a constant code stored in a rolling code updating table, the ciphering means generating the ciphered rolling code by logical operation on the rolling code and the addressed constant code.

9. The remote control system according to claim 7, wherein:
   the system-specific code is read out from the nonvolatile memory device and is used to address a constant code stored in a rolling code updating table, the ciphering means generating the ciphered rolling code by logical operation on the rolling code and the addressed constant code.

10. The remote control system of claim 1, wherein the system-specific code and the rolling code are set at two different times and by different entities.

11. A remote control method using a transmitter and a corresponding receiver for one-way transmission of a transmission code from the transmitter to the receiver, the method comprising the steps of:
   setting a rolling code fixed for each corresponding pair of transmitters and receivers;
   setting a system-specific code set specifically to each corresponding pair of transmitters and receivers such that different said pairs are assigned different system-specific codes and the system-specific code is set as a random code during production of each transmitter and receiver pair;
   ciphering, in the transmitter, the rolling code based on the system-specific code to generate a ciphered rolling code; and generating the transmission code from the transmitter based on an ID code and the ciphered rolling code, the ID code specifically identifying the transmitter and being set independently of the system-specific code.

12. The remote control method according to claim 11 further comprising the step of:

restoring, in the receiver, the ID code by deciphering the ciphered rolling code by the system-specific code used in the transmitter.

13. The remote control method according to claim 11, wherein:

the system-specific code is set at a time different from the setting of the rolling code.

14. The remote control method according to claim 11, wherein:

the rolling code is set in the process of designing the transmitter and receiver pairs.

* * * * *